(12) United States Patent  (10) Patent No.: US 6,710,820 B2
Hida  (45) Date of Patent: Mar. 23, 2004

(54) AUDIO MUTING APPARATUS CONTROLLED BY AN INTERACTING AUDIO SIGNAL

(75) Inventor: Kiyonori Hida, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 395 days.

(21) Appl. No.: 09/755,110

(22) Filed: Jan. 8, 2001

(65) Prior Publication Data

US 2001/0019366 A1 Sep. 6, 2001

(30) Foreign Application Priority Data

Jan. 7, 2000 (JP) ........................................ 2000-000031

(51) Int. Cl.[7] .................................................. H04N 3/24
(52) U.S. Cl. ........................................ 348/632; 348/738
(58) Field of Search ................................. 348/632, 738; 381/94.5; 327/309, 549

(56) References Cited

U.S. PATENT DOCUMENTS 5,283,819 A  *  2/1994 Glick et al. ..................... 379/90
5,414,386 A  *  5/1995 Adachi et al. ................. 330/51
5,444,312 A  *  8/1995 Noblett et al. ............... 327/552
5,655,051 A  *  8/1997 Furuta et al. ................. 386/105
5,796,851 A  *  8/1998 Hewitt et al. ............... 381/94.5
5,887,177 A  *  3/1999 Heyl ...................... 395/750.01
5,963,652 A  * 10/1999 Tran et al. ................... 381/109

FOREIGN PATENT DOCUMENTS

| JP | 57-78142 | 10/1955 |
| JP | 63-65332 | 4/1988 |
| JP | 3-70472 | 7/1991 |

* cited by examiner

Primary Examiner—Victor R. Kostak
(74) Attorney, Agent, or Firm—Crowell & Moring LLP

(57) ABSTRACT

An audio muting apparatus including a control device 3 for gradually varying a converted output voltage 12 from a D/A converter 4 from an initial voltage to a prescribed voltage when performing muting and gradually varying the converted output voltage from the prescribed voltage to the initial voltage when releasing the muting. A muting section 5 for passing an audio signal in such a manner that an impedance between an audio signal path and a ground level is increased when the converted output voltage 12 becomes the initial voltage and interrupting passage of the audio signal in such a manner that the impedance between the audio signal path and the ground level is decreased when the converted output voltage 12 becomes the prescribed value.

11 Claims, 2 Drawing Sheets

AUDIO MUTING APPARATUS CONTROLLED BY AN INTERACTING AUDIO SIGNAL

BACKGROUND OF THE INVENTION

This invention relates to an audio muting apparatus for muting an audio signal under the control of means for interrupting passage of the audio signal using a D/A converter.

In a television receiver, when the channel to be received is changed, an audio signal is muted. A conventional technique for muting is disclosed in the Unexamined Japanese Utility Model Application Publication No. Sho 63-65332. Specifically, in this technique, a pulse creating means is provided which creates a train of pulses which have a shortest or longest width at a starting time or ending time of muting and an opposite width at an intermediate time. A low pass filter is also provided for converting the pulse train into a muting signal having a gentle slope. In response to the muting signal, the muting means mutes the audio signal.

However, the above technique gives rise to the following problem. Specifically, in order to convert the pulse train created by the pulse creating means into the muting signal with a gentle slope, the low pass filter must be provided. On the other hand, the low pass filter must be constructed using discrete components such as a resistor and capacitor. This presented the problem of an increase in the number of discrete components. Further, in order to change the width of the pulse width of the pulse train, complicate control is required. This presented the problem of complication of the program for control.

This invention has been accomplished in order to solve the above problem.

An object of this invention is to provide an audio muting apparatus which can omit a low pass filter by creating a signal having a gentle slope necessary for the muting using a D/A converter.

Another object of this invention is to provide an audio muting apparatus which can attenuate the level of pop sound in releasing the muting to a practical level by setting the converting accuracy in the D/A converter to the value exceeding 8 bits.

Still another object of this invention is to provide an audio muting apparatus which can attenuate the level of pop sound more greatly by decreasing the varying speed of the output voltage from the D/A converter when a muting transistor is shifted from an "ON" state from an "OFF" state.

A further object of this invention is to provide an audio muting apparatus for preventing complication of the control for muting without generating pop sound in such a manner that the time interval when the state of a D/A converter is changed between a first output state and a second output state is fixed whereas the difference between the output voltage in the first output state and that in the second output state is varied and the envelope signal of the output from the D/A converter is taken out as a muting signal.

A still further object of this invention is to provide an audio muting apparatus which can decrease the capacitance of a capacitor in a low pass filter by shortening the time interval when the state of a D/A converter is changed between a first output state and a second output state.

A further object of this invention is to provide an audio muting apparatus which can mute sound when the channel to be received is changed.

SUMMARY OF THE INVENTION

In order to solve the above problem, the audio muting apparatus according to this invention comprises:

a D/A converter;

control means for gradually varying a converted output voltage from the D/A converter from an initial voltage to a prescribed voltage when performing muting and gradually varying the converted output voltage from the prescribed voltage to the initial voltage when releasing the muting; and muting means for passing an audio signal in such a manner that an impedance between an audio signal path and a ground level is increased when the converted output voltage becomes the initial voltage and interrupting passage of the audio signal in such a manner that the impedance between the audio signal path and the ground level is decreased when the converted output voltage becomes the prescribed value.

Specifically, the converted output voltage produced from the D/A converter varies gradually. Therefore, in the muting means, the impedance between the audio signal path and ground level varies gradually. Thus, occurrence of pop sound is prevented when the state of the muting means is changed from the state of interrupting the passage of the audio signal to the state of passing the audio signal.

In addition to the above construction, the D/A converter has an converting accuracy of at least 8 bits.

Specifically, although the converted output voltage from the D/A converter varies stepwise, the stepwise variation is minute so that it is substantially smooth.

In addition to the above construction, the initial voltage is set in the vicinity of 0 V, the muting means includes a muting transistor with a collector connected to the audio signal path, an emitter connected to ground and a base supplied with the converted output voltage, and the control means slows down the speed of reducing the converted output voltage when the converted output voltage is caused to fall to cross the vicinity of 0.6 V.

Specifically, when the converted output voltage falls to cross 0.6 V, the muting means is shifted from the state of interrupting the passage of the audio signal to the state of passing the audio signal. Therefore, the shifting from the state of interrupting the passage of the audio signal to the state of passing the audio signal becomes more gentle.

The audio muting apparatus comprises:

a D/A converter;

envelope detecting means for extracting an envelope signal from an output from the D/A converter;

control means for changing the state of the D/A converter between a first output state and a second output state at prescribed time intervals, the first output state being a state of producing a first voltage whereas the second output state being a state of producing a second voltage; and muting means for varying the impedance between the audio signal path and ground level to interrupt the passage of the audio signal according to a level of the envelope signal.

The control means gradually varies a difference between the first voltage and the second voltage from the vicinity of 0 V to a prescribed voltage when performing muting and gradually varying the difference between the first voltage and the second voltage from the prescribed voltage to the vicinity of 0 V when releasing the muting.

Specifically, since the D/A converter is controlled at prescribed time intervals, the control is simplified. Where the muting is carried out and the muting is released, also when the D/A converter is changed between the first output state and the second output state at prescribed time intervals, the envelope detecting means produces an envelope signal whose level changes gently. Therefore, in the muting means, the impedance between the audio signal path and grounding level varies gently. As a result, occurrence of pop sound is prevented when the state of the muting means is changed from the state of interrupting the passage of the audio signal to the state of passing the audio signal.

In addition to the above construction, the period of changing the state of the D/A converter between the first output state and the second output is shortened.

Specifically, the signal component which must be removed by the envelope detecting means is a signal component at a high frequency. Therefore, the signal component which is not necessary can be removed using a capacitor having small capacitance.

In addition to the above construction, the period is set to shorter than 100 $\mu$S.

Specifically, the signal component which must be removed in the envelope detecting means is a component at a frequency higher than 10 KHz. Therefore, the signal component which is not necessary can be removed using a capacitor having small capacitance.

In addition to the above construction, the audio signal path is a signal path through which a received audio signal of television broadcasting is passed, and the control means performs muting when a received channel of television broadcasting is changed.

Specifically, when the channel received in the television broadcasting is changed, occurring noise can be muted.

DETAILED DESCRIPTION OF THE PREFERRED EMBODIMENTS

Figure 1:
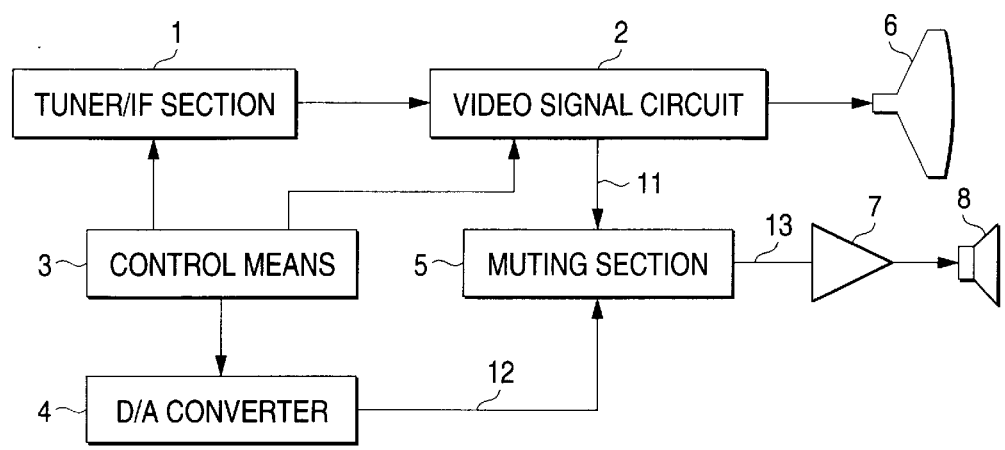
FIG. 1 is a block diagram showing an electric configuration of a television receiver provided with an embodiment of an audio muting apparatus according to this invention.

Now referring to the drawings, an explanation will be given of various embodiments of this invention.

FIG. 1 is a block diagram of an electric configuration of a television receiver provided with a first embodiment of an audio muting apparatus according to this invention.

In FIG. 1, a tuner/IF section is a block which receives a signal at a frequency set by a control means 3, and frequency-converts the received signal and amplifies an intermediate frequency signal obtained by frequency conversion.

A video signal circuit 2 is a block which video-detects the intermediate frequency signal produced from the tuner/IF section 1 and subjects the video-detected signal to predetermined processing. Using the signal acquired by the predetermined processing, a CRT 6 is driven. The audio signal acquired after the video detection is sent to a muting section 5 through a path 11.

A D/A converter 4 is a converter which has converting accuracy of 8 bits and converts the digital value of 8 bits produced from the control means 8 into an analog voltage in a voltage range from 0 V to 5 V.

A control means 3 is a block whose main part is a microcomputer integrated in the same chip as in the D/A converter 4. This control means controls the main operation of the television receiver. Namely, the control means performs the control for setting the channel received by the tuner/IF section 1 at a channel directed by a user.

Further, when the control means 3 changes the channel received by the tuner/IF section 1, it controls the video signal circuit 2 to mute the video signal. In order to mute the video signal, the control means 3 gradually changes the converted output voltage from the D/A converter 4 from 0 V (initial voltage) to 5 V (prescribed voltage). Upon completion of the channel change, in order to release the muting of the audio signal, the control means 3 gradually varies the converted output from the D/A converter 4 from 5 V to 0 V. Thus, the muting of the video signal is released.

The muting section 5 is a block which corresponds to the muting means in the inventions defined in aspects 1 to 3. Specifically, when the converted output voltage 12 from the D/A converter 4 is 0 V, the impedance between the video signal path from the path 11 to the path 13 and ground level is increased so that the audio signal outputted from the video signal circuit 2 is passed. When the converted output voltage is 5 V, the impedance between the above video signal path and the ground level is decreased so that passage of the audio signal is interrupted.

An amplifier 7 is a block which amplifies the audio signal guided from the muting section 5 from a path 13, and drives a speaker 8 using the amplified signal.

Figure 2:
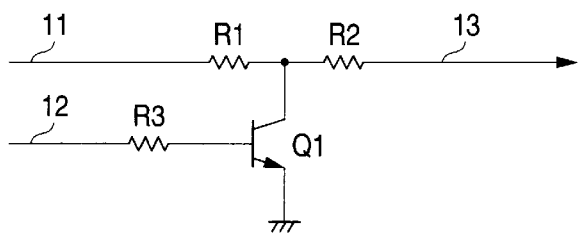
FIG. 2 is a circuit diagram of a detailed electric connection of the muting section (muting means in the inventions defined in aspects 1 to 3) in the first embodiment.

FIG. 2 is a circuit diagram showing the detailed electric connection of the muting section (muting means) 5.

The path 11 from the video signal circuit 2 is led to the one terminal of a resistor R1. The other terminal of the resistor R1 is led to the one terminal of a resistor R2. The other terminal of the resistor R2 is led to the amplifier 7 via the path 13. The collector of a muting transistor Q1 is connected to the junction point of the resistors R1 and R2. The base of the muting transistor Q1 is supplied with the converted output voltage 12 from the D/A converter 4 via the resistor R3. The emitter of the muting transistor Q1 is connected to ground.

The muting section (muting mean) 5 has the configuration described above. Therefore, when the converted output voltage 12 rises to exceed 0.6 V, the muting transistor Q1 is shifted from the OFF state (high impedance state) to the ON state (low impedance state). Namely, the muting transistor is shifted from the state of passing the audio signal to the state of interrupting the passage of the audio signal. When the converted output voltage 12 falls to excess 0.6 V, the muting transistor Q1 is shifted from the ON state to the OFF state. Namely, the muting transistor is shifted from the state of interrupting the passage of the audio signal to the state of passing the audio signal.

Figure 3:
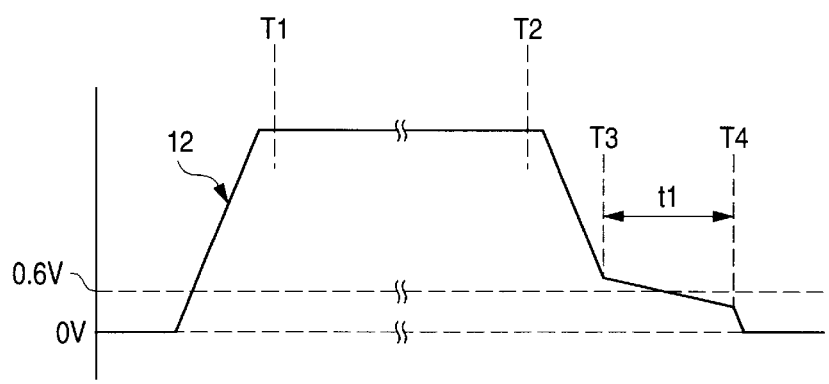
FIG. 3 is a graph showing a change in the output (converted output voltage) from a D/A converter according to the first embodiment.

FIG. 3 is a graph showing a change in the output (converted output voltage) from the D/A converter 4. Referring to FIG. 3, as the occasion demands, the operation of the first embodiment will be explained.

Where the channel received by the tuner/IF section 1 is not changed, the control means 3 gives a digital value of 0 to the D/A converter 4 so that the converted output voltage 12 from the D/A converter 4 is 0 V. Therefore, the muting transistor Q1 turns off. Thus, the audio signal supplied from the video signal circuit 2 to the path 11 is amplified by the amplifier 7, thereby drive the speaker 8.

Where an instruction of changing the channel is issued from a user, the control means 3, before it changes the channel received by the tuner/IF section 1, gradually increases the digital value supplied to the D/A converter 4 from 0 to 255.

Therefore, the converted output voltage 12 from the D/A converter 4 gradually varies from 0 V to 5 V. As a result, the muting transistor Q1 gradually shifts from the OFF state to the ON state so that the audio signal path from the path 11 to the path 13 gradually shifts from the state of passing the audio signal to the state of not passing the audio signal. At timing T1 when the converted output voltage 12 has reached 5 V, the control means 3 changes the channel received by the tuner/IF section 1.

At timing T2 elapsed by e.g. several 100 mS from timing T1, changing of the channel received by the tuner/IF section 1 is completed. Therefore, when the timing T2 has passed, the control means 3 gradually changes the digital value supplied to the D/A converter 4 from 255 to 0. Thus, the converted output voltage 12 from the D/A converter 4 gradually varies from 5 V to 0 V. As a result, the muting transistor Q1 gradually shifts from the ON state to the OFF state. Accordingly, the audio signal path from the path 11 to the path 13 gradually shifts from the state of interrupting the passage of the audio signal to the state of passing the audio signal.

The control means 3, when the converted output voltage 12 has fallen to the vicinity of 0.6 V (timing T3), decreases the falling speed of the digital value supplied to the D/A converter 4. When the converted output voltage 12 has fallen to cross 0.6 V (timing T4), the control means returns the falling speed of the digital value supplied to the D/A converter 4 to that before timing T3.

As a result, the falling speed of the converted output voltage 12 slows down during a period t1 from timing T3 to timing T4. On the other hand, the impedance between the collector and emitter of the muting transistor Q1 starts to rise as the converted output voltage 12 falls toward 0.6 V. When the converted output voltage 12 has fallen to cross 0.6 V, the impedance becomes very large.

On the other hand, when the converted output voltage 12 has fallen to cross 0.6 V, its falling speed has slowed down. Therefore, the muting transistor Q1 gradually shifts from the state of interrupting the passage of the audio signal where the audio signal path from the path 11 to the path 13 is grounded with a low impedance to the state of passing the audio signal where the audio signal path is grounded with a high impedance.

The D/A converter 4 has a converting accuracy of 8 bits. Therefore, although the voltage change in the converted output voltage 12 during the period t1 is stepwise because of omission of a low pass filter, its step component is very minute. As a result, when the muting section 5 is shifted from the state of interrupting the passage of the audio signal to the state of passing the audio signal, pop sound is not generated on the path 13. Further, the noise due to the step component when the converted output voltage changes is suppressed to the level allowable in practical use.

Although the highest level (prescribed voltage) of the D/A converter 4 was set at 5 V, it can be set at any voltage exceeding 0.6 V such as 4 V or 3 V.

The explanation of the first embodiment has been made hitherto. The second embodiment will be explained below.

The electric configuration of the television receiver provided with the second embodiment can be shown in the same block diagram as in FIG. 1. The construction of each of the tuner/IF section 1, video signal circuit 2, CRT 6, D/A converter, amplifier 7 and speaker 8 is the same as that in the first embodiment.

On the other hand, the muting section 5, unlike the construction in the first embodiment in FIG. 2, is composed of two blocks of an envelope detecting means 21 and a muting means 22. Specifically, the envelope detecting means 21 includes a diode D1, a resistor 5 and a capacitor C1. The muting means 22 includes resistors R1, R2, R6 and R7, and muting transistor Q1.

As regards the components which constitute the muting section 5 in the second embodiment, like reference numerals designate like components which constitute the muting section 5 (muting means in FIG. 2) in FIG. 2.

The details of each block will be explained below. The output 12 from the D/A converter 4 is led to the anode of the diode D1. The cathode of the diode D1 is led to the one terminal of the capacitor C1. The other terminal of the capacitor C1 is connected to ground.

The envelope detecting means 21 has the configuration described above. Therefore, the output 12 from the D/A converter 4, after it has been rectified by the diode D1, is removed in its high frequency component by the low pass filter consisting of the resistor R5 and capacitor C1, thereby producing an envelope signal 23.

The envelope signal 23 is led to the base of the muting transistor Q1 through the resistor R6 which limits the base current. The resistor 7 for discharging is connected between the base of the muting transistor Q1 and the grounding level. The resistor R1, resistor R2 and muting transistor Q1 are connected in the same manner as that of the muting means in the first embodiment.

The muting means 22 has the configuration described above. Therefore, when the level of the envelope signal 23 rises to exceed 0.6 V, the impedance between the audio signal path and ground level is reduced so that the muting means 22 is shifted into the state of interrupting the passage of the audio signal. When the level of the envelope signal 23 falls to cross 0.6 V, the muting means 22 is shifted into the state of passing the audio signal.

Figure 4:
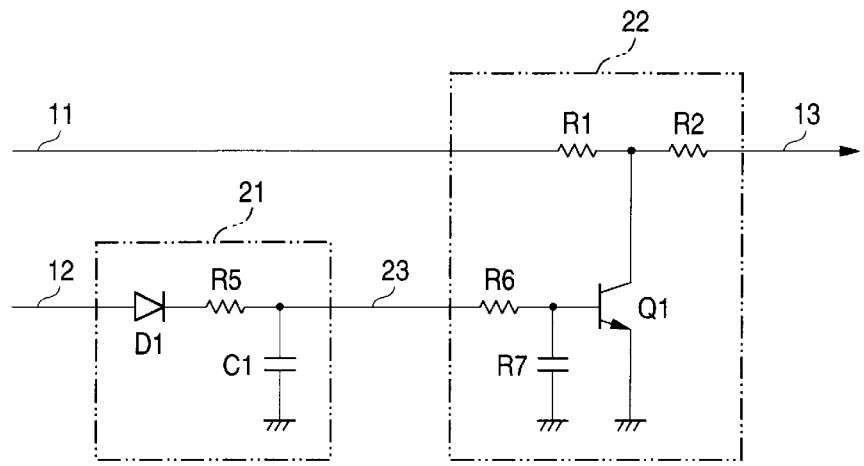
FIG. 4 is a circuit diagram of a detailed electric connection of the muting section (envelope detecting means in the inventions defined in aspects 4 to 6) in the second embodiment.
Figure 5:
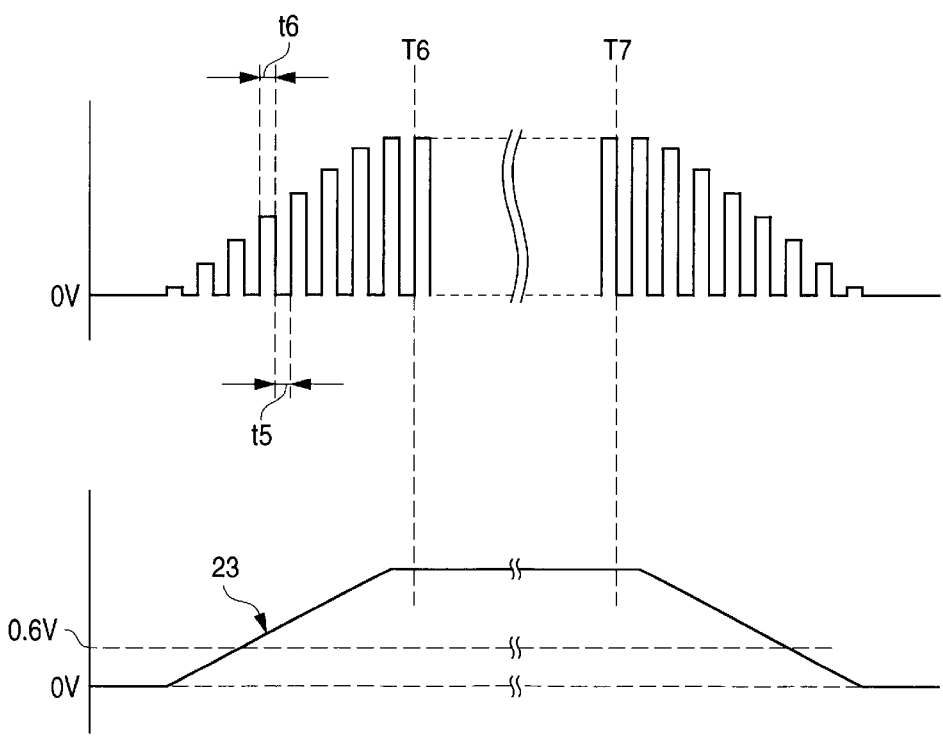
FIG. 5 is a view showing a main signal in the second embodiment.

The explanation referring to FIG. 4 returns to FIG. 1. When the control means 3 makes the operation of muting, as shown in FIG. 5, changes the state of the D/A converter 4 into the first output state of producing the first voltage (0 V) and the second output state of producing the second voltage at prescribed time intervals (t5, t6, . . . ). The control means 3 gradually increases the difference between the first voltage to the second voltage from 0 V to 5 V (prescribed value). When the control means 3 intends to release the muting, it gradually decreases the difference between the first voltage to the second voltage from 5 V to 0 V.

After the control means 3 has placed the state of the D/A converter 4 in the second output state during the period of 20 $\mu$S (t6, . . . ), it changes the state of the D/A converter 4 in the first output state during the period of 20 $\mu$S. Namely, the control means 3 changes the state of the D/A converter 4 between the first output state and the second output state during a short period of 40 $\mu$S. For this reason, an element having minute capacitance can be used as the capacitor C1 constituting the low pass filter of the envelope detecting means 21.

An explanation will be given of the operation of the second embodiment.

Where the channel received by the tuner/IF section 1 is not changed, the control means 3 gives a digital value of 0 to the D/A converter 4 so that the converted output voltage 12 from the D/A converter 4 is 0 V. Therefore, the level of the envelope signal 23 becomes 0 V so that the muting transistor Q1 turns off. Thus, the audio signal supplied from the video signal circuit 2 to the path 11 is amplified by the amplifier 7, thereby driving the speaker 8.

Where an instruction of changing the channel is issued from a user, the control means 3, before it changes the channel received by the tuner/IF section 1, changes the state of the D/A converter 4 between the first output state and the second output state at time intervals of 20 $\mu$S. In addition, the control means 3 gradually increases the difference between the first voltage and the second voltage from 0 V to 5 V. Thus, the level of the envelope signal 23 gradually varies 0 V to the voltage exceeding 0.6 V.

As a result, the muting transistor Q1 shifts from the OFF state to the ON state so that the passage of the audio signal through the audio signal path from the path 11 to the path 13 is interrupted. At timing T6 after the difference between the first voltage and the second voltage has been increased to 5 V, the control means 3 changes the channel received by the tuner/IF section 1.

At timing T7 elapsed by e.g. several 100 mS from timing T1, changing of the channel received by the tuner/IF section 1 is completed. Therefore, when the timing T7 has passed, the control means 3 gradually changes the difference between the first voltage and the second voltage from 5 V to 0 V. Namely, the control means 3 reduces the second voltage from 5 V to 0 V without varying the first voltage. Thus, the level of the envelope signal 23 gradually varies from the voltage exceeding 0.6 V to 0 V. As a result, the muting transistor Q1 gradually shifts from the ON state to the OFF state so that the audio signal passes through the audio signal path from the path 11 to the path 13.

Although the highest level (prescribed voltage) of the difference between the first voltage and the second voltage was set at 5 V, it can be set at any value such as 4 V or 3 V in a range where the level of the envelope signal 23 exceeds 0.6 V.

Where a capacitor for removing a DC component is inserted on the side of anode side or cathode side of the diode D1, the first voltage may be the other voltage than 0 V.

Although the period of changing the state of the D/A converter 4 between the first output voltage and the second output voltage was set at 40 $\mu$S, it maybe any period in a range shorter than 100 $\mu$S.

As understood from the description hitherto made, the audio muting apparatus according to this invention comprises:

a D/A converter;

control means for gradually varying a converted output voltage from the D/A converter from an initial voltage to a prescribed voltage when performing muting and gradually varying the converted output voltage from the prescribed voltage to the initial voltage when releasing the muting; and muting means for passing an audio signal in such a manner that an impedance between an audio signal path and a ground level is increased when the converted output voltage becomes the initial voltage and interrupting passage of the audio signal in such a manner that the impedance between the audio signal path and the ground level is decreased when the converted output voltage becomes the prescribed value. Therefore, the muting means gently varies the impedance between the audio signal path and ground level according to the signal with the voltage changing gradually. Thus, occurrence of pop sound is prevented when the state of the muting means is changed from the state of interrupting the passage of the audio signal to the state of passing the audio signal so that the low pass filter can be omitted.

Further, the D/A converter has an converting accuracy of at least 8 bits. Therefore, although the converted output voltage from the D/A converter varies stepwise, the stepwise variation is minute so that it is substantially smooth. As a result, the level of the pop sound when the muting is released can be attenuated to a practical level.

Further, the initial voltage is set in the vicinity of 0 V, the muting means includes a muting transistor with a collector connected to the audio signal path, an emitter connected to ground and a base supplied with the converted output voltage, and the control means slows down the speed of reducing the converted output voltage when the converted output voltage is caused to fall to cross the vicinity of 0.6 V. Therefore, when the state of the muting is changed from the state of interrupting the passage of the audio signal to the state of passing the audio signal, the change becomes more gentle. The level of the pop sound can be attenuated more greatly.

The audio muting apparatus according to this invention comprises:

a D/A converter;

envelope detecting means for extracting an envelope signal from an output from the D/A converter;

control means for changing the state of the D/A converter between a first output state and a second output state at prescribed time intervals, the first output state being a state of producing a first voltage whereas the second output state being a state of producing a second voltage; and muting means for varying the impedance between the audio signal path and ground level to interrupt the passage of the audio signal according to a level of the envelope signal. The control means gradually varies a difference between the first voltage and the second voltage from the vicinity of 0 V to a prescribed voltage when performing muting and gradually varying the difference between the first voltage and the second voltage from the prescribed voltage to the vicinity of 0 V when releasing the muting. Therefore, the D/A converter is controlled at prescribed time intervals. The envelope detecting means produces an envelope signal whose level changes gently. Thus, occurrence of pop sound is prevented when the state of the muting means is changed from the state of interrupting the passage of the audio signal to the state of passing the audio signal so that complication of control for carrying out the muting can be prevented without generating the pop sound.

Further, the period of changing the state of the D/A converter between the first output state and the second output is shortened. Therefore, the signal component which must be removed by the envelope detecting means is a signal component at a high frequency. Thus, the signal component which is not necessary can be removed using a capacitor having small capacitance so that the capacitance of the capacitor in the low pass filter can be reduced.

Further, the period is set to shorter than 100 $\mu$S. Therefore, the signal component which must be removed in the envelope detecting means is a component at a frequency higher than 10 KHz. Therefore, the signal component which is not necessary can be removed using a capacitor having small capacitance so that the capacitance of the capacitor in the low pass filter can be reduced.

Further, the audio signal path is a signal path through which a received audio signal of television broadcasting is passed, and the control means performs muting when a received channel of television broadcasting is changed. Therefore, when the channel received in the television broadcasting is changed, occurring noise can be muted. Thus, when the received channel is changed, the audio muting can be done.

What is claimed is:

1. An audio muting apparatus comprising:

a D/A converter:

control means for gradually varying a converted output voltage from said D/A converter from an initial voltage to a prescribed voltage when performing muting, and gradually varying the converted output voltage from the prescribed voltage to the initial voltage when releasing the muting; and muting means for passing an audio signal in such a manner that an impedance between an audio signal path and a ground level is increased when the converted output voltage becomes the initial voltage, and interrupting passage of the audio signal in such a manner that the impedance between the audio signal path and the around level is decreased when the converted output voltage becomes the prescribed value wherein said initial voltage is set in the vicinity of 0 V, said muting means includes a muting transistor with a collector connected to said audio signal path, an emitter connected to ground and a base supplied with said converted output voltage, and said control means slows down the speed of reducing the converted output voltage when the converted output voltage is caused to fall to cross the vicinity of 0.6 V.

2. The audio muting apparatus according to 1, wherein said audio signal path is a signal path through which a received audio signal of television broadcasting is passed, and said control means performs muting when a received channel of television broadcasting is changed.

3. The audio muting apparatus according to claim 1, wherein said audio signal path is a signal path through which a received audio signal of television broadcasting is passed, and said control means performs muting when a received channel of television broadcasting is changed.

4. An audio muting apparatus comprising:

a D/A converter;

control means for gradually varying a converted output voltage from said D/A converter from an initial voltage to a prescribed voltage when performing muting, and gradually varying the converted output voltage from the prescribed voltage to the initial voltage when releasing the muting; and muting means for passing an audio signal in such a manner that an impedance between an audio signal path and a ground level is increased when the converted output voltage becomes the initial voltage, and interrupting passage of the audio signal in such a manner that the impedance between the audio signal path and the ground level is decreased when the converted output voltage becomes the prescribed value wherein said D/A converter has a converting accuracy of at least 8 bits and wherein said initial voltage is set in the vicinity of 0 V, said muting means includes a muting transistor with a collector connected to said audio signal path, an emitter connected to ground and a base supplied with said converted output voltage, and said control means slows down the speed of reducing the converted output voltage when the converted output voltage is caused to fall to cross the vicinity of 0.6 V.

5. The audio muting apparatus according to claim 4, wherein said audio signal path is a signal path through which a received audio signal of television broadcasting is passed, and said control means performs muting when a received channel of television broadcasting is changed.

6. An audio muting apparatus comprising:

a D/A converter;

envelope detecting means for extracting an envelope signal from an output from said D/A converter;

control means for changing the state of said D/A converter between a first output state and a second output state at prescribed time intervals, said first output state being a state of producing a first voltage whereas said second output state being a state of producing a second voltage; and muting means for varying the impedance between the audio signal path and ground level to interrupt the passage of the audio signal according to a level of said envelope signal; wherein said control means gradually varies a difference between said first voltage and said second voltage from the vicinity of 0 V to a prescribed voltage when performing muting, and gradually varying the difference between the first voltage and the second voltage from the prescribed voltage to the vicinity of 0 V when releasing the muting.

7. The audio muting apparatus according to claim 6, wherein the period of changing the state of said D/A converter between the first output state and the second output is shortened.

8. The audio muting apparatus according to claim 7, wherein said period is shorter than 100 µS.

9. The audio muting apparatus according to claim 6, wherein said audio signal path is a signal path through which a received audio signal of television broadcasting is passed, and said control means performs muting when a received channel of television broadcasting is changed.

10. The audio muting apparatus according to claim 7, wherein said audio signal path is a signal path through which a received audio signal of television broadcasting is passed, and said control means performs muting when a received channel of television broadcasting is changed.

11. The audio muting apparatus according to claim 8, wherein said audio signal path is a signal path through which a received audio signal of television broadcasting is passed, and said control means performs muting when a received channel of television broadcasting is changed.

* * * * *